Patented Oct. 1, 1929

1,730,245

UNITED STATES PATENT OFFICE

SAMUEL S. SADTLER, OF SPRINGFIELD TOWNSHIP, MONTGOMERY COUNTY, PENNSYLVANIA, ASSIGNOR TO AMIESITE ASPHALT COMPANY OF AMERICA, OF PHILADELPHIA, PENNSYLVANIA, A CORPORATION OF NEW JERSEY

METHOD OF WATERPROOFING STONE

No Drawing. Application filed March 24, 1927. Serial No. 178,140.

This invention relates to improvements in the treatment of stone used in the construction of roads, and the principal object of the invention is to provide novel means for treating the stone, and particularly stone which is capable of absorbing water in substantial amounts whereby the stone is rendered impervious to moisture and whereby such stone may be employed in the construction of roadways without danger of moisture and water entering the body of the roadbed.

I have found that the water-absorbing capacity of stone differs widely, and have found further that in general stones with a relatively low moisture-absorbing capacity make satisfactory road compositions, whereas stones with a high moisture-absorbing capacity are generally unsatisfactory. This is particularly true of the road composition employing a curing asphalt binder and generally known in the trade as "Amiesite".

In some localities, it is extremely difficult to obtain from readily available sources stone of the proper character having a low moisture-absorbing capacity, and the main object of the present invention is to provide a simple and practicle process for rendering stone having high absorption characteristics suitable for road building purposes. The invention, however, is not limited to the treatment of stone having a high moisture-absorbing capacity, since the treatment will improve the general characteristics of any type of stone for road building purposes, even including the use of the stone in the making of concrete.

In practicing my invention, I impregnate the stone by an actual absorption with a relatively non-volatile liquid immiscible with water and relatively non-volatile whereby the immiscible liquid fills the interstices and pores of the stone and effectively prevents the absorption of water and moisture. The impregnating material is applied to the stone at such a degree of fluidity that it may readily be absorbed by the stone, and in a preferred procedure, the stone after being mixed with sufficient of the water immiscible liquid to insure a complete impregnation is stored for one or more days until the impregnation is completed and the materials entirely absorbed.

Prior to the mixing of the stone with the aforesaid water immiscible liquid, the stone may be treated to exclude the natural moisture content, or the admixture with the said liquid may be conducted at temperatures that will insure the exclusion of all moisture in the stone. At times this elevates the temperature of the stone considerably and then thicker asphaltic oils may be used. If the stone is not so hot or is only warm, thinner asphaltic oil mixtures may be used.

In general, any non-saponifiable liquid immiscible with water and relatively non-volatile will be found suitable in practicing the present invention. Relatively non-volatile mineral oil or petroleum products such as paraffine oil may for example be used successfully.

In a preferred procedure, however, I employ asphalite base oil and I prefer to use a heavy oil known as fuel oil. To this I may add some diulent or cutback, such as kerosene, drip oil or the like to make the oil more fluid at the temperature employed in impregnation. The use of cut-back is not a necessary part of the invention as the choice of an asphaltic oil sufficiently fluid for use without cut-back such as kerosene may be selected. As one means of increasing the fluidity of the oil and at the same time rendering the preparation more water-resisting, I add a small amount of fatty acid, such for example as crude oleic acid or red oil, as this tends to combine with the calcium of the limestone to form calcium oleate, a water resisting substance. In preparing the aforedescribed water immiscible liquid for treating the stone, I have found a suitable formula to be:—

Parts by volume.

Asphaltic fuel oil (15 Bé.) _____ 74
Kerosene _____ 24
Oleic acid _____ 1

I do not limit myself, however, to these particular quantities.

In one process, I agitate the stone to be impregnated with an amount of the prepared asphaltic liquid which will be completely absorbed by the stone with little or no excess, or an excess of the liquid may be employed to insure thorough impregnation. The mixture of the stone and asphaltic mixture may be carried on at a temperature above the boiling point of water, which insures exclusion of any moisture that may be in the stone. When the asphalt or asphaltic liquid is mixed with the stone by the heated drum or similar method, the stone does not require previous drying, as the water is expelled at the time of treating with the asphalt. This method is preferable, since it eliminates the formation of dust and enables one to use asphalt of high penetration with little or no cut-back, but care should be taken to bring the stone to a temperature that will completely expel the water. The mixture may be carried on, however, at lower temperatures, and under these circumstances, it is desirable to first treat the stone so as to substantially eliminate the water content.

I have found that stone prepared as described above effectively resists the penetration of water and prevents the moisture from entering the stone and acting to destroy the close cohesive bond between the stone surfaces and the asphaltic coating or bonding material with which the stone is coated following the aforedescribed treatment. Following the admixture of the stone with the water immiscible liquid the entire batch may be stored away in a suitable container or dump covered to exclude rain for one or several days to insure thorough absorption.

I have found also that the treatment tends to toughen or strengthen the stone, preventing crumbling.

I am aware that methods have been proposed for impregnating stone with asphalt by means of vacuum, pressure or other mechanical means, but so far as I am aware I am the first to provide a simple and entirely practical method for effectively waterproofing the stone which utilizes the principle of natural absorption of a water immiscible substance of such degree of fluidity as to permit the aforesaid natural absorption.

I claim:

1. The method of preparing crushed stone for subsequent use in roadbuilding, which comprises heating the stone to expel moisture, treating the stone in a substantially dry condition with an asphaltic base material containing a fatty acid, said material being in a state of fluidity permitting a natural absorption thereof by the stone at ordinary temperatures, and thereafter causing said stone to stand until a substantial penetration has occurred.

2. The method of preparing stone for subsequent use in roadbuilding, which comprises heating the stone to expel moisture, treating the stone with a non-saponifiable water immiscible substance containing a fatty acid, said substance being of substantially low volatility and in a state of fluidity permitting a natural absorption thereof by the stone, and thereafter causing said stone to stand until a substantial penetration has occurred.

SAMUEL S. SADTLER.